(12) United States Patent
Bastholm

(10) Patent No.: US 8,358,096 B2
(45) Date of Patent: Jan. 22, 2013

(54) LINEAR ACTUATOR

(75) Inventor: Jeppe Bastholm, Sønderborg (DK)

(73) Assignee: Linak A/S, Nordborg (DK)

(*) Notice: Subject to any disclaimer, the term of this patent is extended or adjusted under 35 U.S.C. 154(b) by 70 days.

(21) Appl. No.: 12/736,839

(22) PCT Filed: Jun. 24, 2009

(86) PCT No.: PCT/DK2009/000152
§ 371 (c)(1),
(2), (4) Date: Nov. 15, 2010

(87) PCT Pub. No.: WO2009/155922
PCT Pub. Date: Dec. 30, 2009

(65) Prior Publication Data
US 2011/0068725 A1 Mar. 24, 2011

(30) Foreign Application Priority Data
Jun. 27, 2008 (DK) .......................... PA 2008 00884

(51) Int. Cl.
G05G 5/00 (2006.01)
F16H 25/20 (2006.01)
F16D 71/00 (2006.01)

(52) U.S. Cl. ........ 318/626; 318/266; 192/138; 192/141; 74/89.37

(58) Field of Classification Search ............... 318/135, 318/603, 627, 468, 434, 105, 34, 37, 466, 318/803, 800, 80, 83, 626, 266; 74/89.37, 74/526; 192/138, 141, 143; 200/47
See application file for complete search history.

(56) References Cited

U.S. PATENT DOCUMENTS

| 4,246,991 | A  | * | 1/1981  | Oldakowski | 192/223.4 |
| 5,064,044 | A  |   | 11/1991 | Oketani et al. | |
| 5,927,144 | A  |   | 7/1999  | Koch | |
| 6,321,611 | B1 |   | 11/2001 | Szu et al. | |
| 6,459,182 | B1 | * | 10/2002 | Pfann et al. | 310/77 |
| 6,513,398 | B1 |   | 2/2003  | Finkemeyer | |
| 7,066,041 | B2 |   | 6/2006  | Nielsen | |
| 7,262,377 | B1 |   | 8/2007  | Wei et al. | |
| 7,932,473 | B2 | * | 4/2011  | Sorensen et al. | 200/61.41 |
| 8,015,890 | B2 | * | 9/2011  | Christensen et al. | 74/89.38 |
| 8,040,082 | B2 | * | 10/2011 | Bastholm | 318/135 |
| 2007/0035153 | A1 | * | 2/2007 | Henning | 296/105 |
| 2010/0283421 | A1 | * | 11/2010 | Knudsen et al. | 318/468 |
| 2010/0315031 | A1 | * | 12/2010 | Jensen | 318/627 |

FOREIGN PATENT DOCUMENTS

| EP | 0647799 | 4/1995 |
| EP | 1420504 | 5/2004 |

OTHER PUBLICATIONS

English Abstract of EP1420504.

* cited by examiner

Primary Examiner — Eduardo Colon Santana
(74) Attorney, Agent, or Firm — Dykema Gossett PLLC

(57) ABSTRACT

A linear electro-mechanical actuator comprises a housing with a reversible DC-motor (1), which through a transmission (2) can move an activation element (5) between two end positions. The activation element (5) will in the two end positions cause the electrical end stop switches (17, 25) to be activated for interrupting the current for the DC motor (1) in the end positions of the activation element (5) for running the motor (1) in one direction. Parallel to the end stop switches (17, 25), an extra set of switches (21, 23) are incorporated for determining in which end position the activation element (5) is located.

7 Claims, 2 Drawing Sheets

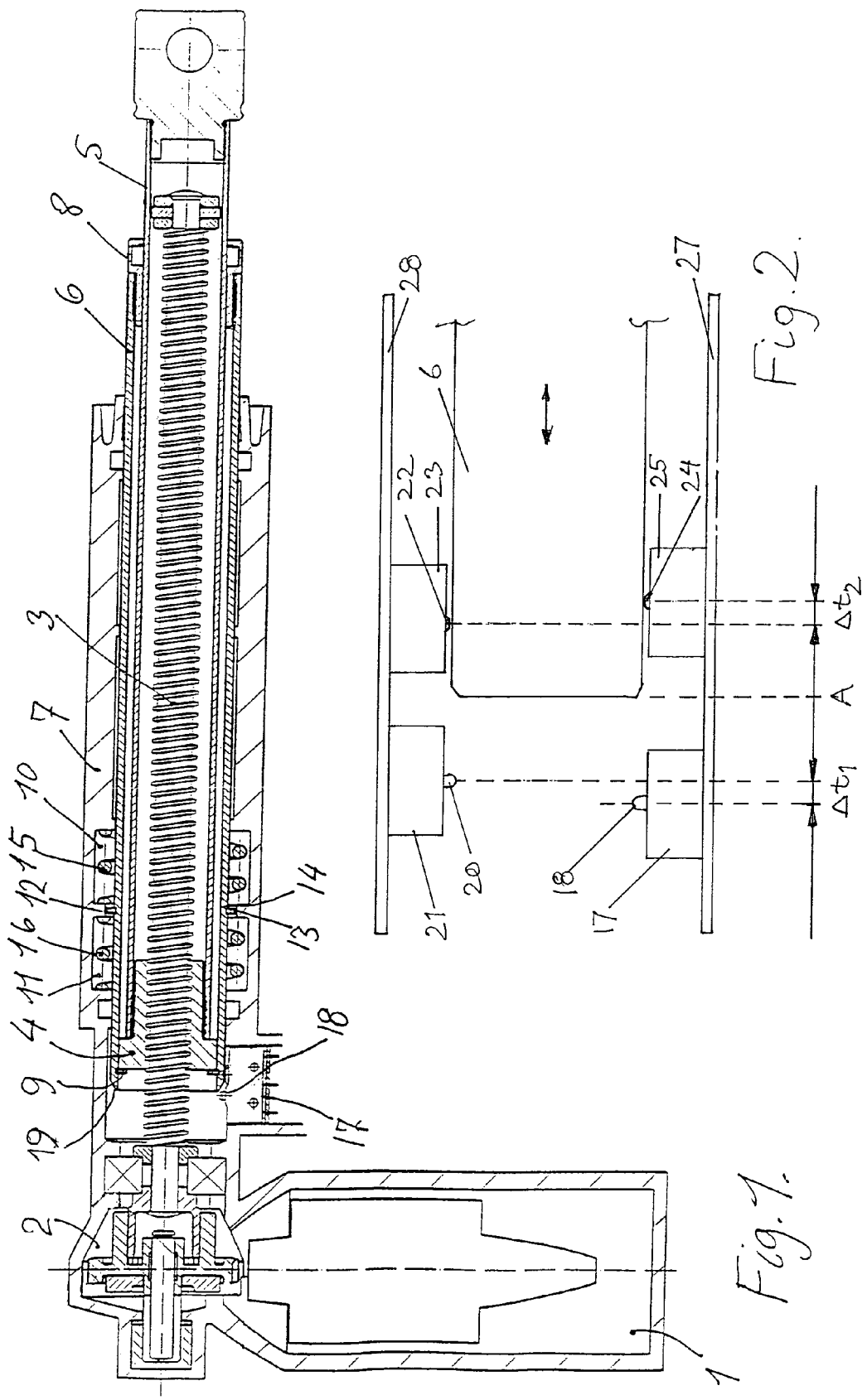

LINEAR ACTUATOR

BACKGROUND OF THE INVENTION

1. Field of the Invention

The present invention relates to a linear actuator.

2. The Prior Art

The explanation of the invention departs from electromechanical linear actuators wherein a spindle with a rotationally fixed spindle nut is driven by a reversible electric motor through a transmission. An activation element in the shape of a piston-like tube is attached to the spindle nut. Alternatively, the activation element may be designed integral with the spindle nut cf., e.g., WO 96/12123 to Koch (Okin). The activation element may be brought to move between two end positions, i.e., a retracted position and an expelled position depending on the direction of rotation of the motor. In the two end positions, the actuator is stopped in that the activation element activates an end stop switch, which signals a control device to interrupt the current for the motor of the actuator. Alternatively, the switches function directly as circuit breakers for the current to the motor.

A common way of arranging end stop switches is to mount these on a rail or a strip-type printed circuit board, which is led into a guide in an outer tube which surrounds the activation element. Examples of this type are known from WO 02/29284 to Linak A/S and U.S. Pat. No. 6,513,398 B1 to Dewert Antriebs-und Systemtechnik GmbH & Co. KG. An example of another way of arranging the end stop switches is disclosed in EP 0 647 799 A3 to Linak A/S. Here, the end stop switches are arranged in connection with one end of the outer tube, which is axially displaceable. When the activation element is in its outermost position, it displaces the outer tube a short distance outwards, thus activating the corresponding end stop switch. In the fully retracted position the activation element displaces the outer tube a little inwards, thus activating the other end stop switch. When an end stop switch is activated, it is basically not known whether the activation element is in one or the other end position. Activation of the end stop switch merely causes an interruption of the motor current.

In certain situations it is, however, desired to know whether the activation element is in one or the other end position. This is, e.g., relevant if the actuator and the function which it performs is hidden inside equipment, or if the operation device is located so that neither the actuator nor the function is visible. The existing end stop switches may in principal be part of a detection of in which end position the activation element is located. This is, however, so difficult and expensive in terms of construction that it is not practiced. As an option for linear actuators, systems exist where the position of the activation element may be determined with a high degree of accuracy. This could, e.g., be a potentiometer, a magnetic-based position determination system with a Hall sensor, or an optical system. These systems meet the requirements where it is necessary at all times to know the exact position of the activation element. These types of systems are expensive and exceed the requirements when it is only desired to determine in which of the two end positions the activation element is located.

When the actuators are incorporated into a structure wherein it is required or desired to distinguish between its two end positions, the manufacturer of the machinery was thus obliged to place independent switches in the structure in order to detect whether the activation element is in one or the other end position. This is both difficult and expensive.

The object of the invention is to provide a solution to the outlined problem, where a simple and inexpensive way of detecting whether the activation element is in one of the end positions is desired, and if so which of the end positions.

SUMMARY OF THE INVENTION

This is achieved according to the invention by incorporation at least one, preferably an extra set, of switches in the actuator for detecting the end positions of the activation element. Such signal switches are used for determining in which end position the activation element is located. In case it is only desired to know one of the end positions, only one signal switch is necessary.

The signal switches are expediently arranged so that they are activated immediately before the activation of the end stop switches. This ensures that the signal switch is activated when the activation element is in the corresponding end position. In principle, signal switches may also be located after the end stop switches, as the activation element due to the inertia continues a short distance after the current for the motor has been interrupted.

An extra set of switches also enables an absolute separation from the electrical system of the actuator. The contacts may thus be potential free or, if desired, be connected to a potential with one of the poles. Whether the contact should be "normally open" or "normally closed" is also a free choice. The connection for the switches may be a cable and/or plug connection to ensure an easy and secure connection out of the actuator. Alternatively to an extra set of signal switches in a separate housing, the extra contact set may according to the invention be integrated directly in the same housing which contains the unique end stop switches. If it is not desired that the two contact sets are activated at the same time, which in most cases would be sufficient, the switches may with their activation parts be displaced from each other.

For the benefit of a simple and easy mounting of the switches in the linear actuator, the switches may be mounted on one or more printed circuit boards which are expediently mounted in specially constructed guides in the actuator. Thus is ensured that the two sets of switches are arranged precisely in a position where they may be activated and deactivated depending on whether the activation element is in one or the other end position. The activation may be directly or indirectly performed by the activation element, e.g., by the spindle nut or an axially displaceable outer tube.

An advantage of the invention is that the solution provided to the outlined problem is simple and inexpensive. By incorporating the necessary extra signal switches into the linear actuator, a simple detection of whether the activation element is in one of the outermost positions is achieved. Further, the difficult, vulnerable and expensive instrumentation of the machinery with switches is rendered redundant.

The invention is not limited to only using the method described above for activating the switches. Other methods are known and may be visualized for activation of the end stop switches and thus also the extra switches.

The core of the invention is not the method for activating the switches, but the fact that an extra set of switches is used for, simply and independently from the electrical system of the actuator, producing a signal indicating whether the activation element is in one of the end positions.

Here, switches designed as mechanical switches are described, but the switches may also be implemented in different ways, e.g., with a pressure transducer or magnetically with a magnet and a Hall-sensor.

BRIEF DESCRIPTION OF THE DRAWINGS

An embodiment of the invention will be explained more fully below with reference to the accompanying drawing, in which FIG. 1 shows a longitudinal section through a linear actuator, showing the principal structure of the actuator, FIG. 2 shows a schematic diagram of the activation of the two sets of end stop and signal switches according to the invention.

DETAILED DESCRIPTION OF THE PREFERRED EMBODIMENTS

Figure 3:
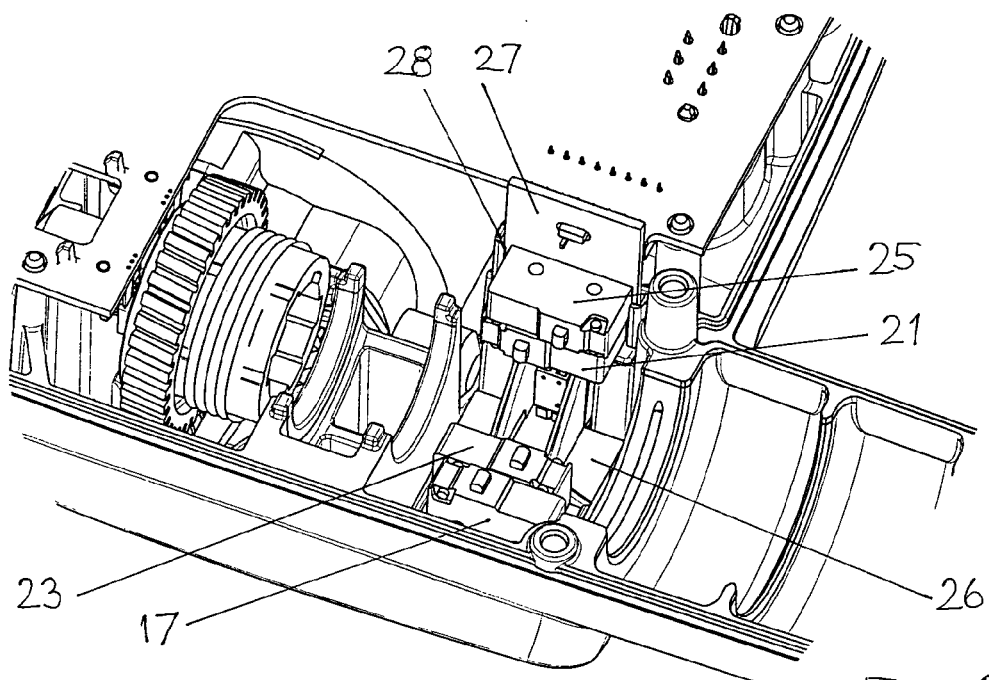
FIG. 3 shows a detailed view showing the arrangement of the two end stop and signal switches.

FIG. 1 shows a longitudinal section through a linear electrical actuator, which basically consists of a DC low-voltage electric motor 1, which through a transmission 2 drives a spindle 3 with a spindle nut 4. On the spindle nut 4 is mounted an activation element 5 in the shape of a tube, which at one end is equipped with a fixture for mounting the actuator in a machinery. When the fixture is mounted in the machinery, the spindle nut 4 is fixed against rotation and thus moves outwards or inwards through rotation of the spindle 3 depending on its direction of rotation. The spindle nut 4 and the activation element 5 attached thereto are guided in the surrounding outer tube 6, which at its free end is equipped with a guide bushing 8. The outer tube 6 is with its one end axially displaceably embedded in the housing 7 of the actuator. The outer tube 6 is internally furnished with a stop ring 9 at the end of the outer tube which protrudes into the housing 7. When the spindle nut 4 during its travel in the ingoing direction meets the ring 9, the outer tube 6 will be retracted inwardly. The movement is limited by two screw springs 15, 16, which surround the outer tube and are located in two cavities 10, 11, between which is located a partition wall 12. As the outer tube 6 has a ring 13 located in a groove 14, the displacement of the outer tube 6 in the longitudinal direction will be determined by the springs 15, 16. In the state where the spindle nut 4 is not in an end position, the outer tube 6 will be in a resting position where the ring 13 is in alignment with the partition wall 12. The ring 13 will thus, depending on the direction when an end stop is reached, compress either the spring 15 or the spring 16, causing the outer tube 6 to be displaced in the longitudinal direction from the resting position in one or the other direction. This will cause the outer tube 6 with its bevel end 19 to move over the activation part 18 of an end stop switch 17. FIG. 1 only shows the end stop switch 17, but parallel thereto there is another end stop switch having a longitudinally displaced activation part. This other end stop switch will be activated by the outer tube 6 when the spindle nut 4 is moved into the other end position. When an end position is reached, the end stop switches may thus directly or indirectly through a control device prevent the motor 1 from running in one direction. Further switches according to the invention are arranged parallel to the shown end stop switch 17 with a view to separating them from the electrical system of the actuator. The mode of operation of such a structure is shown in FIG. 2, and explained below.

The schematic diagram shown in FIG. 2 shows the displaceable outer tube 6 and four switches 17, 21; 25, 23, which function as end stop switches 17, 25 and signal switches 21, 23 respectively. In this embodiment a contact set is provided in each switch, but it is possible to have more contact sets at which an end stop switch and a signal switch may be incorporated into the same housing. The end stop switch 17, 25 interrupts the motor current for the actuator either directly when the switch is activated or indirectly in that the signal from the switch is received by a control device, which interrupts the current for the motor. As shown, the switches are offset in the longitudinal direction of the axis of the outer tube. When the outer tube 6 is displaced due to the fact that the spindle nut 4 has reached an end stop, either in the shape of the ring 9 or the bushing 8, the outer tube 6 will be displaced in the longitudinal direction and activate the switches in that the activation part 18, 20, 22, 24 is either activated or deactivated. The signal switch 21; 23 will be activated first and subsequently the associated end stop switch 17; 25 will be activated. When the linear activation element 6 changes its direction of movement due to reversal of the rotation direction of the motor, the outer tube 6 will be displaced in the other direction. As a result of this, the two switches will be released again until the resting position of the outer tube is reached (the resting position is indicated with "A" in FIG. 2), where the springs 15, 16 are in mutual balance. This resting position of the outer tube 6 is maintained until the spindle nut 4 meets the physical end stop 8,-9 in the other direction, after which the outer tube 6 is displaced from the resting position to also release the other set of switches, first the signal switch 21, 23 and subsequently the end stop switch 17, 25, which interrupts the current for the motor. The fact that there is a displacement in the activation of the switches so that the signal switch 21, 23 is activated before the end stop switch 17, 25, is due to the wish that the signal switch 21, 23 should be activated when the end stop switch 17, 25 is activated.

Figure 4:
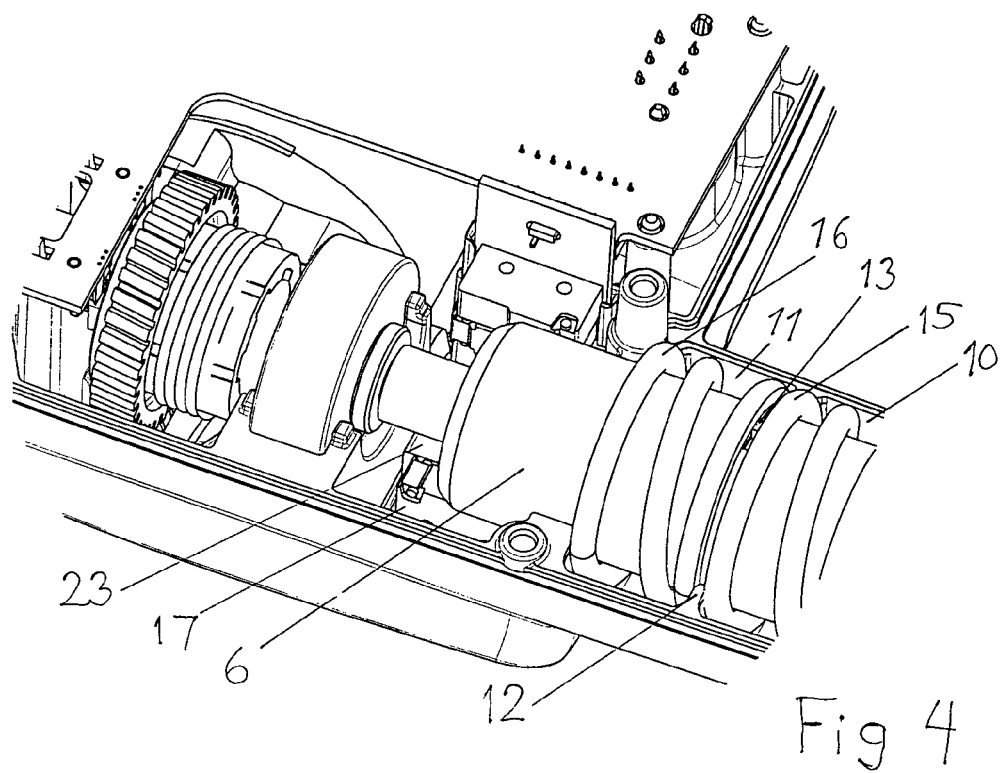
FIG. 4 shows a detailed view as in FIG. 3, but showing the displaceable outer tube in its resting position relative to the activation of end stop switches and signal switches.

FIG. 3 shows a detailed view of the lower part of the actuator, where the outer tube 6 has been removed, so that the two sets of switches 17,21; 25,23 are visible. Here it can instantaneously be seen that the activation points for the switches are displaced so that the signal switches 21,23 are activated immediately before the end stop switches 17,25 are activated. How the switches are affected by the longitudinally displaceable outer tube is shown in FIG. 4, where the outer tube 6 is located in its place. The spring set 15, 16 serves to retain the outer tube in a resting position at the partition wall 12, where none of the switches 17, 21, 23, 25 are activated. It should be noticed that even though the outer tube in the resting position has activated the signal switch 23 and the end stop switch 25, the contact set in these switches is not activated until the activation parts are released. The control device reverses the function of the signal. Alternatively, switches with opposite topology may be used, i.e. "normally closed" and "normally open" for indication of the meeting with one or the other end stop. It can be seen that the edge of the longitudinally displaceable outer tube 6 moves over the switches 17,21; 23,25 and causes the compression of the spring set 15,16 when the spindle nut 4 meets the physical end stops 8,9.

The linear actuator is set for mass production in that the switches 17,21; 23,25, as shown in FIG. 3, are arranged on one or more printed circuit boards 26,27. The printed circuit boards are beforehand equipped with cabling, where the cable e.g. may be connected to a plug connection. The printed circuit boards 26,27 may quickly and easily be mounted in the actuator by being arranged and fixed in specially designed guides 28 in the actuator housing. Thus it is further ensured that the switches 17,21; 23,25, are arranged precisely in the position where they may be activated for interrupting the motor current and signaling that the spindle nut 4, and thereby the activation element 5, is at an end position. This construction eliminates time consuming and expensive adjustments during the production. When using multiple printed circuit boards 26, 27 the end stop switches 17, 25 are expediently arranged on a shared printed circuit boards and the signal switches 21, 23 on another. This ensures a better electrical isolation, and in this way the signal switches 21, 23 becomes an option which may be offered to the customer and not a standard.

The invention claimed is:

1. A linear actuator comprising, a reversible DC motor, which through a transmission can move an activation element between two end positions, a power supply for the DC motor, an electrical control device comprising a set of end stop switches for interrupting the current for the DC motor in the end positions of the activation element, an operation device connected to the control device, and a set of position switches for determining in which end position the activation element is located, and including contact sets for the end stop switch and the position switch which are chosen with combinations of "open" and "normally closed", which means that the position switches provide an unambiguous indication of whether the activation element is in one of the end positions, and the end stop switches signal to the control device that the motor current for running the motor in one direction should be interrupted, or directly interrupt the motor current for running the motor in one direction respectively.

2. The linear actuator according to claim 1, wherein said position switches are located such that they give a signal before the respective end stop switches are activated.

3. The linear actuator according to claim 1, wherein the end stop switches and the position switches are incorporated in the same unit, which is constituted by a housing for the switches.

4. The linear actuator according to claim 3, wherein contact sets for the end stop switches and the position switches are electrically separated from each other.

5. The linear actuator according to claim 3, wherein contact sets for the respective end stop switches and the position switches are electrically connected.

6. The linear actuator according to claim 1, wherein said position switches and end stop switches are designed on at least one printed circuit board.

7. The linear actuator according to claim 6, wherein the actuator has guides for receiving, retaining and positioning one or more printed circuit boards with end stop and/or position switches.

* * * * *